Figure 1:
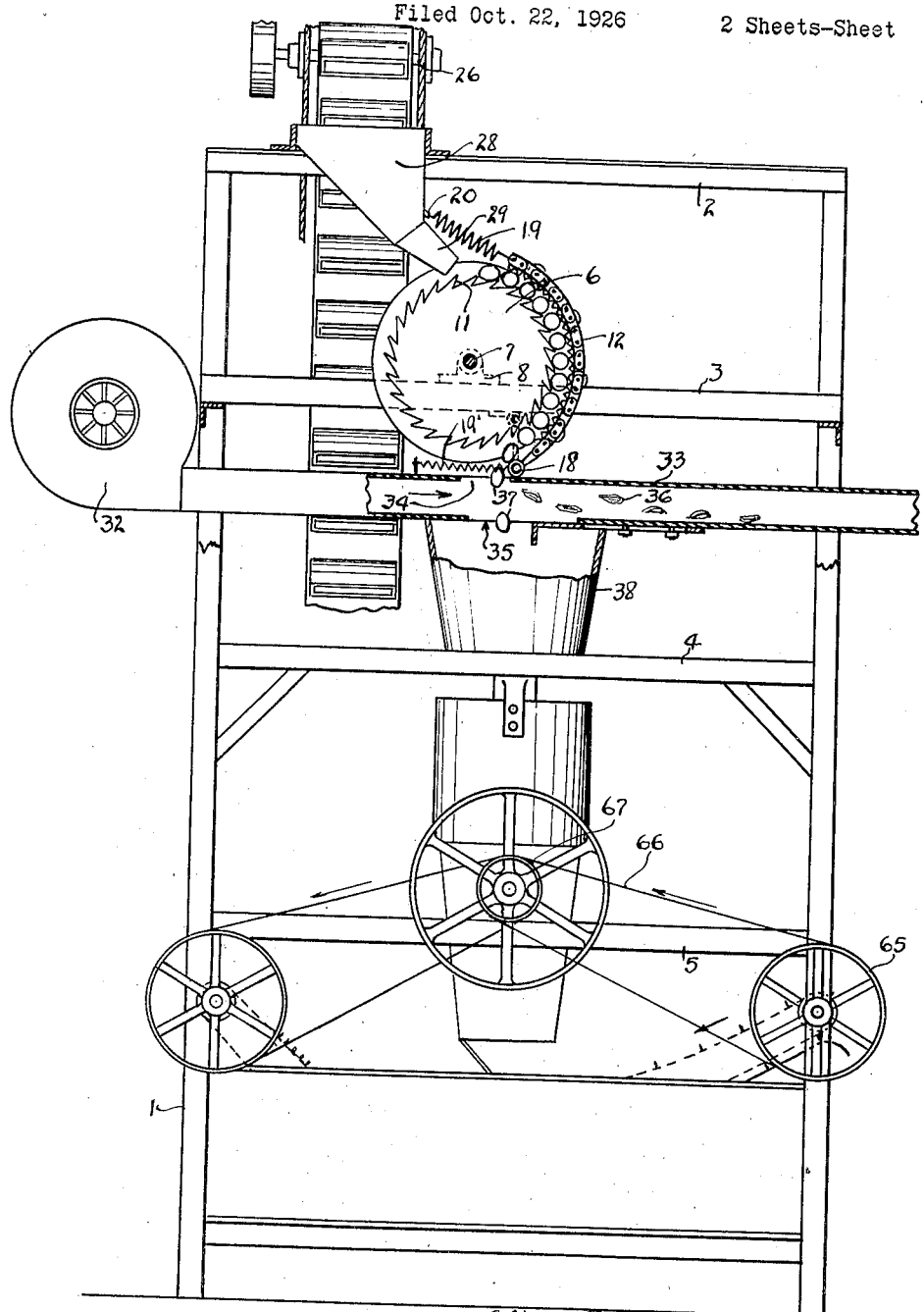

Sept. 4, 1928.

A. P. J. VOIGT 1,683,004

MACHINE FOR HUSKING NUTS

Filed Oct. 22, 1926

2 Sheets-Sheet 1

Albert P. J. Voigt. Inventor

By Jesse R. Stone

Attorney

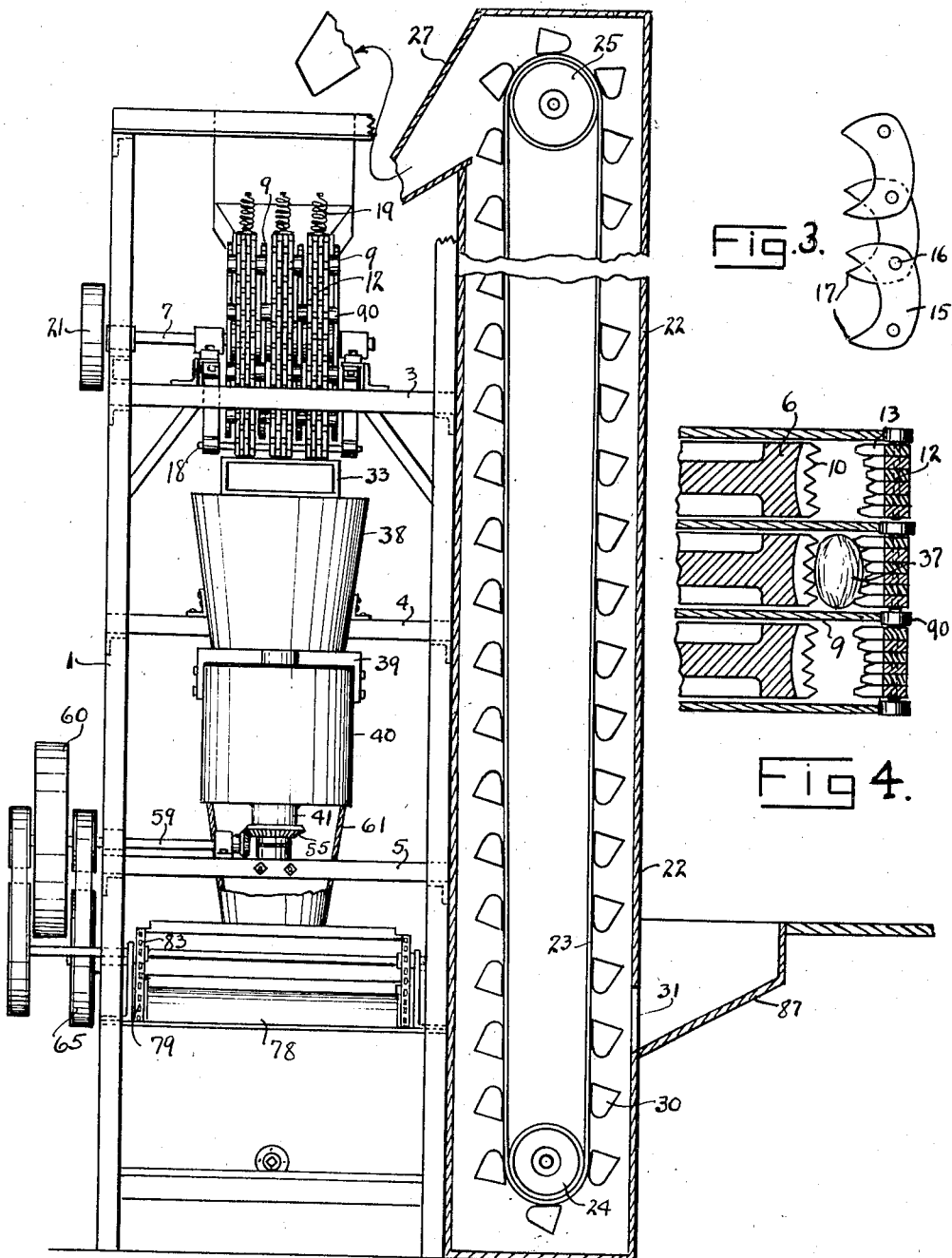

Patented Sept. 4, 1928.

1,683,004

UNITED STATES PATENT OFFICE.

ALBERT P. J. VOIGT, OF GALVESTON, TEXAS.

MACHINE FOR HUSKING NUTS.

Application filed October 22, 1926. Serial No. 143,355.

The invention relates to a machine or apparatus for removing the husks and shells from nuts, and particularly nuts of palm trees of the cohune variety.

Nuts of this nature have an outer husk or shuck of fibrous, tough material and secured somewhat firmly to the hard shell beneath. The kernel of the nut is of an oily nature and fits loosely within the hard shell. It is an object of this invention to provide a commercial, practical apparatus which will make it possible to remove the husk and the shell from the kernel of the nut rapidly and without injury to the kernel. It is desired that the husk be removed and the shell cracked away from the kernel without injuring or bruising the kernel within, and to thereafter separate the kernel from the shell.

It is a further object to provide a device for the purpose set out which will be capable of successfully operating upon nuts of different sizes without danger of injury to the nuts.

Other objects and advantages of the invention will more clearly appear from the specification which follows.

Referring to the drawing herewith, Fig. 1 is a side elevation, certain parts being broken away in section, and illustrating the manner in which the husks are removed from the shells. Fig. 2 is an end elevation, partly in vertical section, illustrating the manner in which the nuts are delivered to the husking apparatus. Fig. 3 is a broken detail illustrating the construction of the stationary cutting element on the husking device, and Fig. 4 is a sectional detail illustrating the rotary and the stationary cutters making up the husking device. Like numerals of reference are employed to designate like parts in all the views.

With reference particularly to Figs. 1 and 2, it will be noted that the apparatus is mounted upon the frame work made up of uprights 1 with supporting cross members 2, 3, 4 and 5 transversely of the uprights. Upon this frame work is mounted a device for husking the outer shuck from the nuts. This husking device comprises a series of cutters 6 mounted closely adjacent each other upon a shaft 7 supported in bearings 8 upon the support 3. The cutters 6, as shown in Figs. 1 and 4, are made up of discs mounted on the shaft 7 and I have shown three such cutters upon the shaft, each separated from the adjacent cutter by a partition 9 which is stationary and adapted to support the stationary cutter to be later described. The cutter is formed with a series of teeth 10 thereon cut circumferentially about the disc. These teeth are cut within transverse teeth or projections 11, arranged about the periphery of the disc, projecting forwardly in the direction of rotation of the cutter. As will be noted from Fig. 4, the transverse teeth 11 are arranged concave relative to the outer periphery of the disc so as to better engage about the nuts which are of a rounded, oval shape, as indicated in the drawings.

Mounted closely adjacent the rotary cutters 6 are stationary cutters 12. These cutters are made up of a series of small plates 13 somewhat crescent shaped, as shown in Fig. 3. I have shown six such plates or series of plates arranged closely adjacent each other and secured together near their ends by rivets or pins 16. The ends of the plates 15 project inwardly and are pointed, as shown at 17, to engage with the nuts and act to tear the husk from the nut. The cutters 12 have lateral rollers 90 bearing upon the partition 9 and limiting the inward movement of the said cutters 12 relative to cutters 6. The stationary cutter 12 is flexible, as will be noted, and is secured at its lower end to a cross rod 18, held resiliently toward the rotary cutter by springs 19'. Its upper end is connected by means of a tension spring 19 to the frame work at 20 and tends to draw the stationary cutter resiliently toward the rotary cutter, as will be readily understood. The rotary cutter shaft 7 is adapted to be rotated through means of a pulley 21 at one end thereof.

The nuts are delivered to the husking apparatus by means of an elevator or conveyor housed within a chute 22. It comprises an endless belt 23 running over a lower pulley 24 and an upper pulley 25, said upper pulley being mounted within the frame work of the device upon a shaft 26 somewhat above the upper supporting cross bar 2. The chute or housing 22 has an outlet spout 27 inclined downwardly from the upper end thereof to discharge within a hopper 28, discharging through an outlet 29 upon the upper faces of the rotating cutters 6.

The belt 23 has thereon a series of cups or buckets 30 extending the full width of the belt and adapted to dip into and engage the nuts which are fed into the lower end of the housing through an opening 31. The belt is rotatable through means of the upper pulley 25 to elevate the nuts from the lower end of the chute and discharge them through the spout 27 to the husking device.

Below the husking device is a blower for separating the husks from the nuts. This blower comprises a rotary fan housed at one side of the device, as shown at 32. Said blower is adapted to force a draught of air through a spout 33 transversely of the machine. Said spout has an opening 34 in its upper side directly below the husking element through which the nuts and husks are delivered. Below the opening 34 is an opening 35, leading to a hopper 38. The effect of the draught of air from the blower is to carry away the husks, shown at 36, and to allow the heavier nuts, shown at 37, to drop directly through the spout of the blower into the hopper to be delivered to the shelling apparatus.

The hopper 38 terminates at its lower end closely adjacent a rotatable spider 39. Said spider has radial arms connected at their outer ends to the upper portion of a rotary bowl 40. The lower end of said bowl is formed with a central hub or bushing 41 having a bearing about a shaft.

The gear 55 meshes on said shaft with a gear mounted upon the shaft 59 extending laterally from the frame work and having thereon a pulley 60 of relatively large diameter through which rotation will be communicated to the said shaft.

Below the cracker is a downwardly tapered chute 61 which is adapted to discharge the nuts, after the shell has been cracked, into a device for separating the shells from the kernels. Said device includes a tank in which the conveyor 78 is mounted on sprocket chains 59, said chains being operated through connection with drive sprockets 83 and by means of which the nuts are submerged to allow the shells and kernals to be separated.

In the operation of the device, the nuts to be shelled will be discharged through a hopper 87 into the housing 22 and elevated by the buckets 30 to be discharged into the upper end of the husking apparatus.

When received upon the husking apparatus, the rotation of the disc cutters 6 will carry them around, as shown in Fig. 1, between the rotary cutter and the stationary cutter. In passing between the cutters in the manner clearly indicated in Fig. 1, the knives upon the cutters will cut into and tear the outer husk from the shell so that when the nuts have passed the lower end of the stationary cutter to be discharged through the opening 34, the husks will be entirely severed from the shell and the blast of air from the blower 32 will carry the husks out through the chute 33.

The nuts will fall through the opening 35 into the hopper 38 and willl pass into the cracking device below. It will be noted that the operation is a continuous one and that without adjustment, the device will accommodate itself to all ordinary sizes of nuts which will be used. The advantages of the device will be obvious to those skilled in the art, without further description.

What I claim as new and desire to protect by Letters Patent is:

1. In a device of the character described, a husking device comprising a rotating disc cutter, toothed both transversely and circumferentially, a stationary member comprising a plurality of rows of links toothed at each end and secured transversely together to produce a flexible cutter, and means to hold said flexible cutter yieldably toward said rotary cutter.

2. A device for husking nuts of the character described comprising a rotating cutter having its periphery concaved and toothed to engage the nuts, a stationary cutter made up of a series of rows of plates toothed on their inner faces, and connected flexibly together, and means to hold said stationary cutter yieldably toward said rotary cutter.

3. A device for husking nuts of the character described comprising a rotating cutter having its periphery concaved and toothed to engage the nuts, a stationary cutter made up of a series of rows of crescent-shaped plates with the ends presented inwardly and connected together adjacent their ends, and means to hold said stationary cutter yieldably toward said rotary cutter.

4. A device for husking nuts of the character described comprising a rotating cutter having its periphery concaved and toothed to engage the nuts, a stationary cutter made up of a series of rows of plates toothed on their inner faces, and connected flexibly together, said rows of plates being connected transversely so as to form a concave surface presented toward the rotary cutter, and means to hold said stationary cutter yieldably toward said rotary cutter.

5. A device for husking nuts of the character described comprising a rotating shaft, a plurality of spaced rotary cutters, spacing plates between said cutters, the peripheries of said cutters having concaved teeth inclined forwardly in the direction of rotation, a cooperating flexible stationary cutter also concaved transversely and cooperating with each of said rotary cutters, means to hold said stationary cutters yieldably toward said rotary cutters, but allowing the passage of nuts of varying sizes.

In testimony whereof I hereunto affix my signature this 14th day of October, A. D. 1926.

ALBERT P. J. VOIGT.